United States Patent [19]

Umezono et al.

[11] Patent Number: 5,018,403

[45] Date of Patent: May 28, 1991

[54] GLOBOID WORM GEAR SPEED REDUCTION APPARATUS

[75] Inventors: Shiro Umezono; Minoru Maki, both of Yokohama, Japan

[73] Assignee: Nippon Gear Co., Ltd., Japan

[21] Appl. No.: 541,155

[22] Filed: Jun. 20, 1990

Related U.S. Application Data

[63] Continuation of Ser. No. 431,679, Nov. 3, 1989, abandoned, which is a continuation of Ser. No. 140,089, Dec. 31, 1987, abandoned.

[30] Foreign Application Priority Data

Aug. 5, 1987 [JP] Japan ............................ 62-119259

[51] Int. Cl.$^5$ .................. F16H 55/08; B23F 13/06
[52] U.S. Cl. ............................. 74/425; 74/458; 51/287; 409/38; 409/48; 409/66; 409/76
[58] Field of Search ............. 74/383, 424.7, 425, 74/425.5, 427, 458, 500; 51/287; 409/38, 48, 66, 76; 29/159.2

[56] References Cited

U.S. PATENT DOCUMENTS

| | | | |
|---|---|---|---|
| 1,790,608 | 1/1931 | Trbojevich | 74/500 |
| 1,847,721 | 3/1932 | Marles | 74/500 |
| 2,432,246 | 12/1947 | Mackmann et al. | 74/458 |
| 3,875,635 | 4/1975 | Pavlov et al. | 498/48 |
| 4,047,449 | 9/1977 | Popov | 74/458 |
| 4,184,796 | 1/1980 | Sakai et al. | 409/12 |

*Primary Examiner*—Allan D. Herrmann
*Attorney, Agent, or Firm*—Michael A. Painter

[57] ABSTRACT

The present invention relates to a speed reduction apparatus for globoid worm gears. The speed reduction ratio of the engaged worm globoid worm gear and worm wheel is defined as the ratio of the rate of rotation of the globoid worm gear about its axis to the rate of rotation of the worm wheel about its axis. The structure of the present invention speed reduction apparatus is defined by the distance between the axes of rotation of the worm wheel and globoid worm gear and the spacial and speed relationships between the globoid worm gear and the surfaces of the cutting tool employed to generate the worm gear.

2 Claims, 2 Drawing Sheets

GLOBOID WORM GEAR SPEED REDUCTION APPARATUS

This application is a continuation of application Ser. No. 431,679 filed Nov. 3, 1989 now abandoned, which is a continuation of application Ser. No. 07/140,089 filed Dec. 31, 1987, now abandoned.

BACKGROUND OF THE INVENTION

1. Field of the Invention

The present invention generally relates to globoid worm gears, and in particular, to a globoid worm gear speed reduction apparatus for improving the transfer of rotational power from a globoid worm gear to an engaged worm wheel.

2. Prior Art

The prior art discloses several forms of worm gearing in general, and globoid worm gears in particular. As an example of the prior art, Applicants refer to Japanese application Ser. No. 51-72808, filed June 22, 1976 and Japanese Patent No. 62-19970 issuing thereon. The corresponding United States application matured into U.S. Pat. No. 4,184,796 issued Jan. 22, 1980. One of the Applicants, M. Maki, is a co-inventor of the method claimed in U.S. Pat. No. 4,184,796 (the "'796 patent"). In the '796 patent, the method of forming globoid worm gears is disclosed in a manner shown in FIG. 3 of the drawing. The helical thread of the worm gear is cut through the use of a cutting tool employing a frusto-conical surface. In the method taught in the '796 patent, the center of rotation of the cutting tool, when swinging along the axis of the worm gear, is equal to the distance between the axes of rotation of an engaged worm wheel and worm gear, the speed of rotation of the cutting tool being substantially equal to the worm wheel.

The prior art fully discloses the structure of what is conventionally referred to as a Hindley globoid worm gear and the method of forming same. As disclosed in the prior art, conventional Hindley worm gears are generally formed through the use of tools employing linear surfaces. In the present invention, the linear tool is replaced with one having a frusto-conical surface, the cross-section thereof being substantially in the form of an isosceles triangle. The theory is fully described in the article entitled "An Investigation of Secondary Action on Skew Gears" by T. Sakai and M. Maki appearing in The Transactions of American Society of Mechanical Engineers, Journal of Engineering for Industry, published in February, 1974. One of the joint inventors of the present invention, M. Maki, is one of the authors.

The prior art discloses a number of improved methods for enlarging the engagement area of Hindley worms and gears. The present invention provides for increased engagement between the globoid worm gear and worm wheel and thereby increases the horsepower transmission characteristics. The present invention solves the problems inherent in those disclosed in the prior art by utilizing a globoid worm gear formed by a cutting tool employing a frusto-conical surface. To achieve this objective, in the formation of the worm gear, the cutting tool swings along an arc in a plane including the axis of the worm gear, the distance between the center of rotation of the cutting tool and the axis of the worm gear being incrementally increased to a distance which is greater than the distance between the axis of the worm wheel and the axis of the globoid worm gear when engaged. Under this condition, the speed reduction ratio existing at the time of the formation of the worm gear is incrementally greater than the speed reduction ratio calculated with respect to the rate of rotation of an engaged worm wheel and worm gear. The structure of a worm thread in accordance with the present invention is equivalent to the worm thread of a conventional Hindley globoid worm only at the center of the worm gear. The structure of the worm thread reflects its formation by a cutting tool employing a frusto-conical surface longitudinally moved along the worm about a center of rotation spaced incrementally beyond the center of an engaged worm wheel. The resulting worm gear provides for increased engagement with a worm wheel thereby increasing the horsepower transmission characteristics.

SUMMARY OF THE INVENTION

The present invention comprises an improved structure for a worm gear speed reduction apparatus which improves power transmission characteristics. In operation, a worm gear rotates about an axis, the helical worm thread thereof engaging the teeth of a worm wheel which rotates about an axis which is typically perpendicular to the axis of the worm gear. The structure of the present invention worm thread improves the power transmission characteristics between the worm gear and worm wheel.

A worm gear in accordance with the present invention employs a worm thread formed by a frusto-conical cutting tool. The cutting tool swings along an arc which includes the plane of the axis of the worm gear, the distance between the center of rotation of the cutting tool and the axis of the worm gear being incrementally greater than the distance between the center of rotation of the worm wheel and the axis of the worm thread at the center thereof when the two are engaged.

It is therefore an object of the present invention to provide an improved globoid worm gear speed reduction apparatus.

It is another object of the present invention to provide a structure for the worm gear thread having improved power transmission characteristics.

DESCRIPTION OF THE PRESENTLY PREFERRED EMBODIMENT

Figure 1:
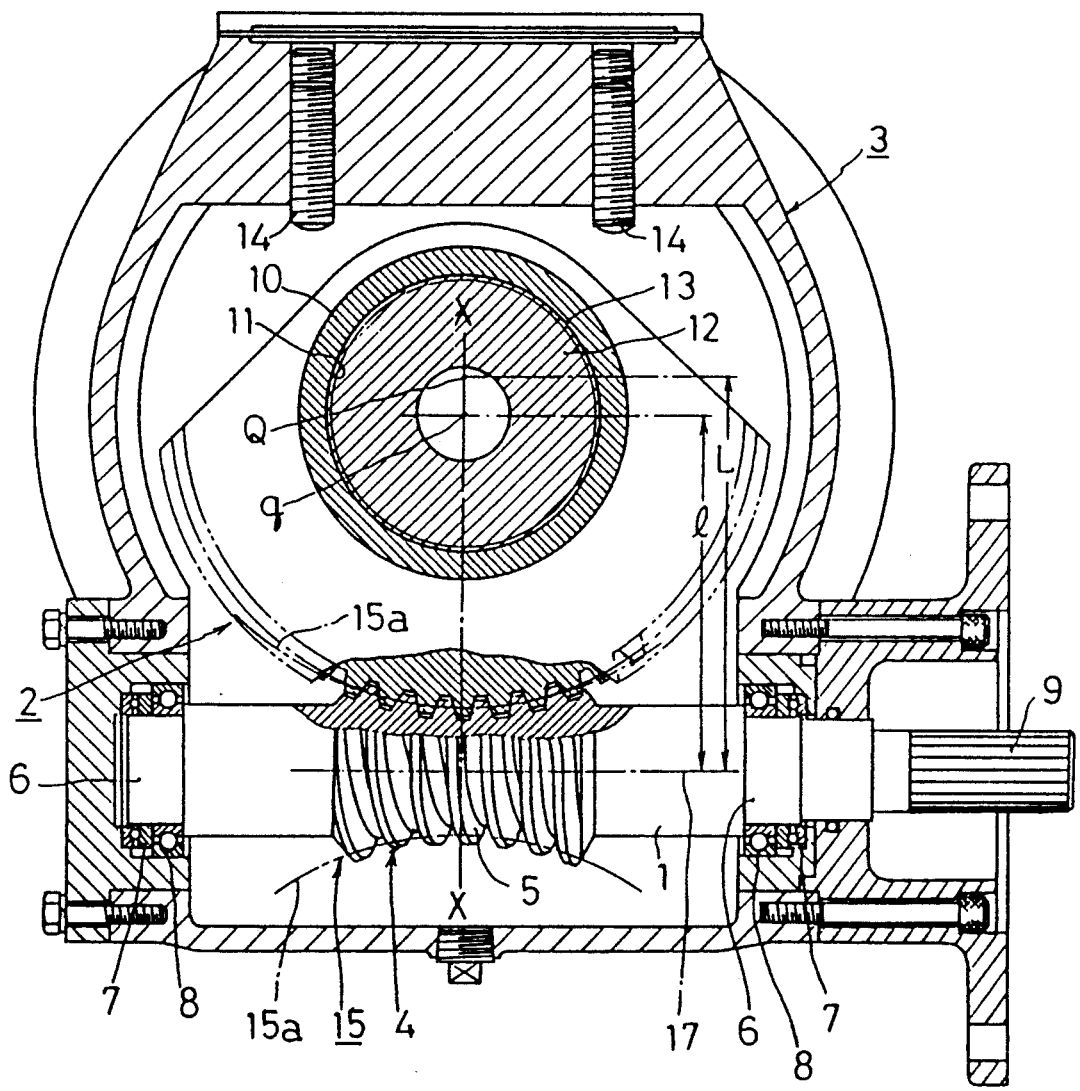
FIG. 1 is a front elevation, cross-sectional view of an engaged worm wheel and globoid worm gear in accordance with the present invention.

The present invention can be best understood by reference to FIG. 1 wherein a globoid worm gear in accordance with the present invention is generally designated by the reference numeral 4. The present invention employs a worm blank 15 generally in the form of a double envelope or hourglass profile 15a which is well known in the art. The worm blank 15 is integral with a cylindrical worm shaft 1. A helical worm thread 5 is formed in worm blank 15, the method of forming the structure of worm thread 5 is described in detail hereinbelow. Worm shaft 1 terminates at ends 6 which are generally supported within case 3 and are rotatably journeled therein by conventional thrust bearings 7 and radial bearings 8. Worm shaft 1, at one end 6 thereof, is provided with a plurality of splines 9 for coupling to a rotational input source.

In the worm gear system illustrated in FIG. 1, worm wheel 2 is engaged with worm gear 4. In the application shown in FIG. 1, worm wheel 2 includes a boss 10 which is rotatably supported in a wall of casing 3. Fitted within the bore 11 of boss 10 is an adapter 12 which is coupled to a shaft which can be employed for opening and closing a valve or the like. Adapters 12 are secured within engagement grooves or splines 13, limiting screws 14 controlling the rotational angle of worm wheel 2 in accordance with the specific application. As shown, worm wheel 2 rotates about an axis which is substantially perpendicular to the axis 17 of worm gear 4.

Figure 2:
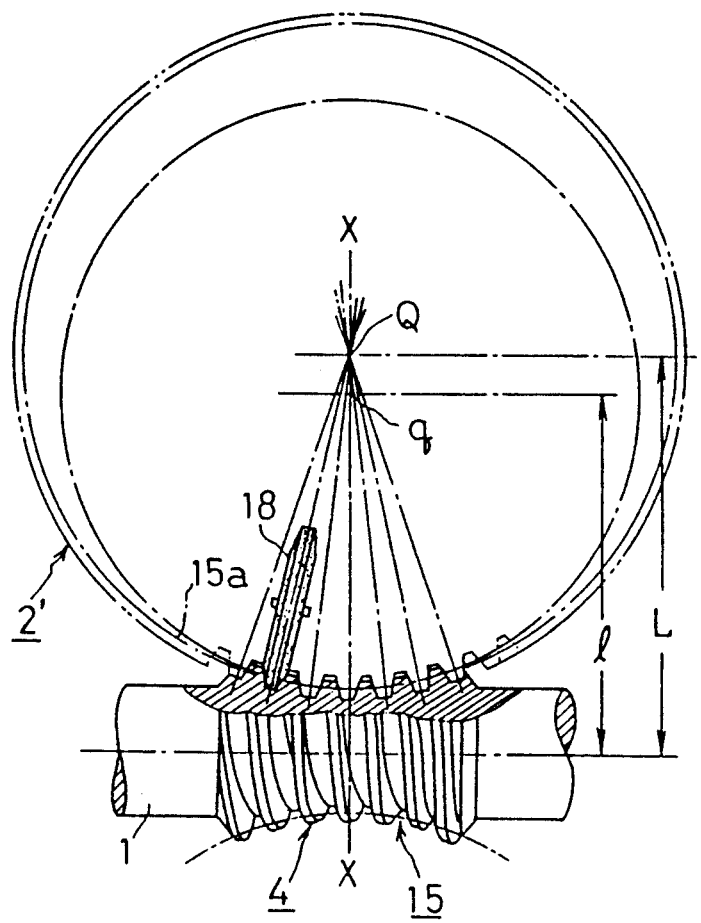
FIG. 2 is a schematic, partial cross-sectional view of a cutting tool forming a globoid worm gear in accordance with the present invention.

As can be best seen in FIG. 2, worm gear 4 is cut by the frusto-conical surface of rotating tool 18. Rotating tool 18 typically comprises a conventional cutting tool such as a grinding wheel. The arcuate, swinging movement of cutting tool 18 is along axis 17 of worm gear 4 and is about center of rotation Q. The axis of rotation of worm wheel 2, when engaged with worm gear 4, is schematically depicted by the reference q, the distance between point q and the axis 17 of worm gear 4 being denoted by the letter 1. In accordance with the present invention, the distance between the center of rotation Q of cutting tool 18 and axis 17 of worm gear 4 is denoted by the reference L.

Figure 3:
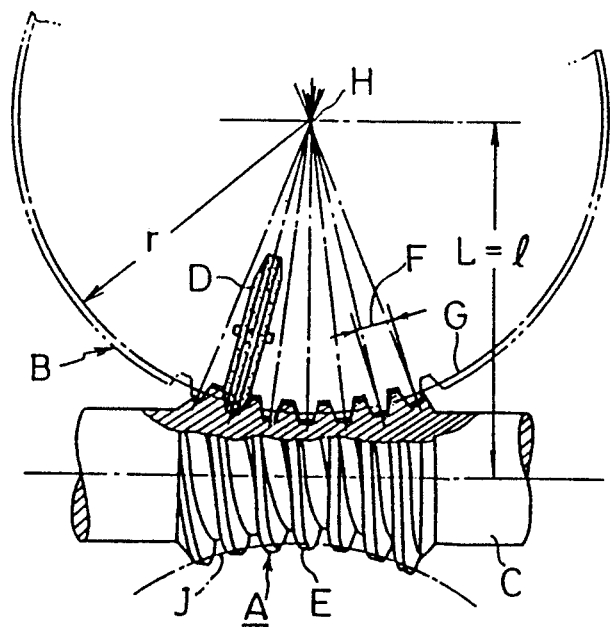
FIG. 3 is a schematic, partial cross-sectional view of the formation of the worm thread of a globoid worm gear in accordance with that disclosed in the prior art.

As stated hereinabove, FIG. 3 schematically depicts a worm gear formed in accordance with the methods taught by the prior art. As can be seen in FIG. 3, the center of rotation of cutting wheel D is identical to the axis of rotation H of worm wheel B. In terms of the distances between the center of rotation of the cutting tool and the axis of rotation of the worm wheel: L=1. In forming a worm gear 4 in accordance with the present invention, the distance L is incrementally greater than the distance 1, i.e., L>1.

The characteristics of the worm gear system are a function of the conditions existing at the time of formation of the worm thread 5. The speed reduction ratio is denoted by the reference j and is defined as the ratio between the rate of rotation of worm gear 4 and the rotary cutting tool 18 at the time worm thread 5 is formed. When worm wheel 2 is engaged with worm gear 4, the speed reduction ratio i is defined as the ratio of the rate of rotation of worm gear 4 to the rate of rotation of worm wheel 2.

An object of the present invention is to provide an improved globoid worm gear system with increased power transmission characteristics. The worm gear 4 exhibits a worm thread 5 which has been cut by a frusto-conical cutting tool 18, the center of rotation Q being incrementally farther from axis 17 of worm gear 4 than the center of rotation q of worm wheel 2. The result is an improvement in the engagement characteristics between worm wheel 2 and globoid worm gear 4. Under equal rotational speeds, and employing a worm thread 5 comprising a single thread, the following relationships exist:

speed reduction ratio i=60:1;
worm wheel teeth=60
distance 1=196.857 mm;
speed reduction ratio j=61:1;
distance L=199.55 mm.

It can therefore be seen that worm gear 4 will meet the stated objectives if worm thread 5 is cut by swinging cutting tool 18 along an arc having a radius of curvature L and utilizing a speed reduction ratio j which is at least one unit greater than the speed reduction ratio i of the engaged worm wheel 2 and worm gear 4.

We claim:

1. A globoid worm gear speed reduction apparatus comprising:
    (a) a worm wheel having a plurality of equally spaced teeth disposed about an axis in a circle;
    (b) a globoid worm gear of the double envelope type having a worm thread disposed about its axis in engagement with the teeth of said worm wheel, the axis of said globoid worm gear being transverse to the axis of said worm wheel, said worm thread being defined by a conical cutting tool surface moved through an arc in a plane which includes the axis of said globoid worm gear, the radius of the arc being greater than the distance between the axes of said worm wheel and said globoid worm gear when said worm thread is engaged with the teeth of said worm wheel.

2. A globoid worm gear speed reduction apparatus comprising:
    (a) a worm wheel having a plurality of equally spaced teeth disposed about an axis in a circle;
    (b) a globoid worm gear of the double envelope type and having a helical worm thread disposed about the axis of said globoid worm gear and in engagement with the teeth of the worm wheel, said axis of said globoid worm gear being transverse to the axis of said worm wheel, said worm thread being defined by a conical cutting tool surface when the ratio of the rate of rotation of said globoid worm gear to the rate of rotation of said conical cutting tool is greater than the ratio of the rate of rotation of said globoid worm gear to said worm wheel when said worm thread is in engagement with the teeth of said worm wheel.

* * * * *